No. 848,912. PATENTED APR. 2, 1907.
C. C. LEUTY.
DISK PLOW.
APPLICATION FILED OCT. 3, 1906.
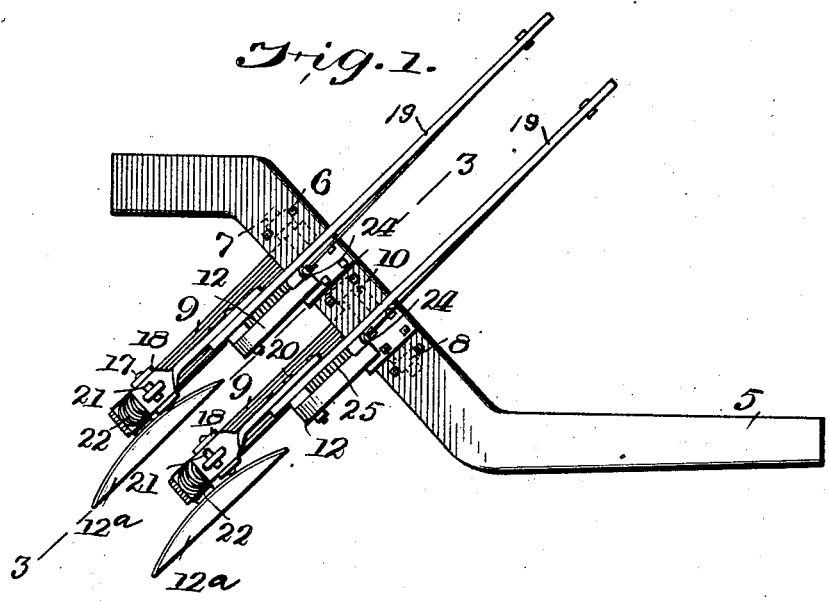
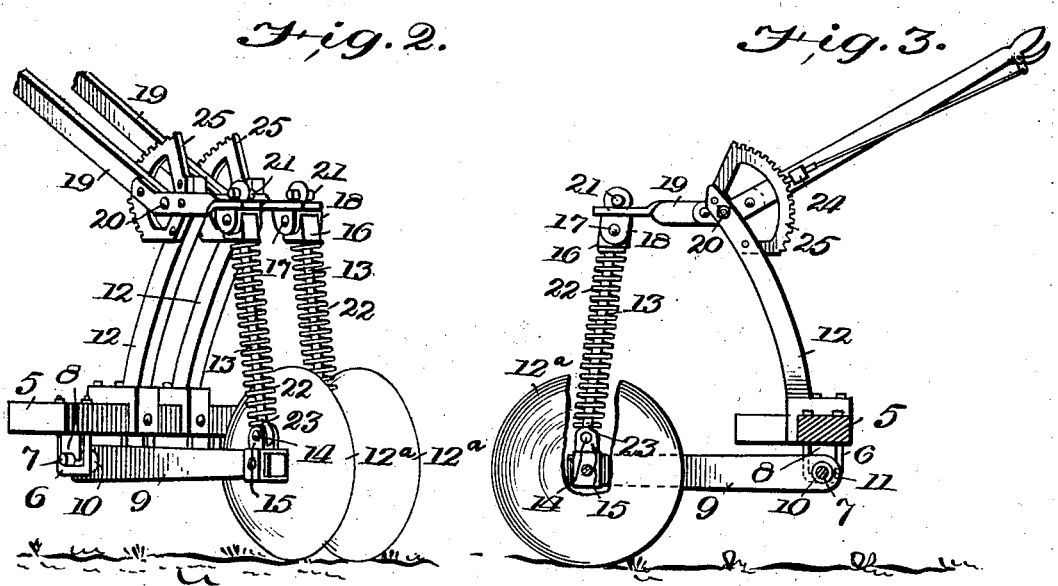
WITNESSES:
F. C. Barry
M. A. Schmidt
Clyde C. Leuty, INVENTOR
BY Milo B. Stevens & Co.
Attorneys

UNITED STATES PATENT OFFICE.

CLYDE CLIFFORD LEUTY, OF JUSTIN, TEXAS.

DISK PLOW.

No. 848,912.

Specification of Letters Patent.

Patented April 2, 1907.

Application filed October 3, 1906. Serial No. 337,201.

*To all whom it may concern:*

Be it known that I, CLYDE CLIFFORD LEUTY, a citizen of the United States, residing at Justin, in the county of Denton and State of Texas, have invented new and useful Improvements in Disk Plows, of which the following is a specification.

This invention relates to disk plows, and has for its object to provide improved devices for connecting the disks and their controlling-levers so that the disks may be raised or lowered and so that each disk will have a yielding movement, enabling the machine to more readily pass obstructions and reducing the liability of breakage of the disks when they strike a rock or other obstruction.

In the accompanying drawings, Figure 1 is a top plan view of the invention. Fig. 2 is a rear end view. Fig. 3 is a vertical section on the line 3 3 of Fig. 1.

Referring specifically to the drawings, 5 denotes the main beam of the plow, to which the wheels (not shown) may be attached in the ordinary manner. On the under side of the beam are hangers 6, which carry a rod 7, extending parallel to the beam. The rod is spaced from the beam by spacing-blocks 8. The disk-carrying beams 9 are independently hinged on the rods to swing up and down, their front ends having eyes through which the rod extends. The beams 9 are spaced on the rod by collars 10 on said rod between the beams, the collars being adjustably fastened to the rod by set-screws 11. The disks 12ª are mounted on the rear ends of the beams 9 in the ordinary manner.

Each beam 9 is independently connected at its rear end to a standard 12, rising from the beam 5. Such connection is a yielding one and comprises a rod 13, attached at one end to the beam 9 by a transverse bolt 14, secured in ears 15, extending from said beam, said bolt extending through a hole in the rod 13. The other end of said rod extends through a block 16, having trunnions 17, whereby it is pivotally mounted between depending ears 18 at the end of a lever 19, fulcrumed at 20, to the standard 12. The lever has an opening through which the upper end of the rod works, and the rod has a transverse key 21 resting on top of the lever to prevent its withdrawal from the block.

A spring 22 is coiled around the rod 13, one end of the spring being hooked into a hole 23 therein and the other end bearing against the block 16. The lever 19 is provided with a latch 24, engageable with a segment-rack 25, whereby the lever can be locked in adjusted postion. The springs 22 will be of sufficient strength to hold the disks in proper working position.

As the disks are independently hinged to the main beam of the plow, if one of them strikes a rock or other obstruction it will yield and ride over it, after which the spring returns it to working position, and only the disk which encounters the obstruction receives the strain. The disks are readily set to enter ground the desired depth by adjustment of the levers 19, and said levers also serve to hold the disks above the ground when the plow is not in use.

I claim—

In a disk plow, the combination of a main beam, a disk-carrying beam hinged thereto, a hand-lever pivotally mounted on the main beam and having an opening and depending ears at one end, a block pivoted between said ears, under the lever, and having a vertical opening, a rod connected at its lower end to the disk-carrying beam and extending at the upper end through the openings in the aforesaid block and lever, a cross-key extending through the top of the rod and arranged to rest upon the lever, and a spring coiled around the rod between the block and the disk-carrying beam.

In testimony whereof I have signed my name to this specification in the presence of two subscribing witnesses.

CLYDE CLIFFORD LEUTY.

Witnesses:
B. F. DONALD,
J. C. LEE.